United States Patent
Bangalore et al.

(10) Patent No.: US 9,135,241 B2
(45) Date of Patent: Sep. 15, 2015

(54) SYSTEM AND METHOD FOR LEARNING LATENT REPRESENTATIONS FOR NATURAL LANGUAGE TASKS

(75) Inventors: Srinivas Bangalore, Morristown, NJ (US); Sumit Chopra, Jersey City, NJ (US)

(73) Assignee: AT&T Intellectual Property I, L.P., Atlanta ( * ) Notice: Subject to any disclaimer, the term of this patent is extended or adjusted under 35 U.S.C. 154(b) by 892 days.

(21) Appl. No.: 12/963,126

(22) Filed: Dec. 8, 2010

(65) Prior Publication Data
US 2012/0150531 A1   Jun. 14, 2012

(51) Int. Cl.
*G06F 17/28* (2006.01)

(52) U.S. Cl.
CPC ...................... *G06F 17/28* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| | | | |
|---|---|---|---|
| 5,619,709 A * | 4/1997 | Caid et al. ..................... | 715/209 |
| 5,675,819 A * | 10/1997 | Schuetze ......................... | 704/10 |
| 6,178,396 B1 * | 1/2001 | Ushioda ........................... | 704/1 |
| 6,847,966 B1 * | 1/2005 | Sommer et al. ................ | 707/739 |
| 6,990,238 B1 * | 1/2006 | Saffer et al. .................... | 382/224 |
| 7,167,823 B2 * | 1/2007 | Endo et al. ....................... | 704/7 |
| 7,353,164 B1 * | 4/2008 | Bellegarda ........................ | 704/1 |
| 7,483,892 B1 * | 1/2009 | Sommer et al. ..................... | 1/1 |
| 2008/0183463 A1 * | 7/2008 | Deane ............................... | 704/9 |
| 2011/0060983 A1 * | 3/2011 | Cai et al. ......................... | 715/254 |
| 2011/0119050 A1 * | 5/2011 | Deschacht et al. ............... | 704/9 |
| 2011/0258229 A1 * | 10/2011 | Ni et al. ......................... | 707/776 |

OTHER PUBLICATIONS

Ando, Applying Alternating Structure Optimization to Word Sense Disambiguation, 2006, CoNLL-X, ACL, pp. 77-84.*
Ando et al., A High-Performance Semi-Supervised Learning Method for Text Chunking, 2005, ACL, pp. 1-9.*
Ergezinger et al.. Ergezinger, An Accelerated Learning Algorithm for Multilayer Perceptrons: Optimization Layer by Layer, 1995, IEEE, vol. 6 No. 1, pp. 31-42.*

(Continued)

*Primary Examiner* — Lamont Spooner

(57) ABSTRACT

Disclosed herein are systems, methods, and non-transitory computer-readable storage media for learning latent representations for natural language tasks. A system configured to practice the method analyzes, for a first natural language processing task, a first natural language corpus to generate a latent representation for words in the first corpus. Then the system analyzes, for a second natural language processing task, a second natural language corpus having a target word, and predicts a label for the target word based on the latent representation. In one variation, the target word is one or more word such as a rare word and/or a word not encountered in the first natural language corpus. The system can optionally assigning the label to the target word. The system can operate according to a connectionist model that includes a learnable linear mapping that maps each word in the first corpus to a low dimensional latent space.

20 Claims, 7 Drawing Sheets

(56) References Cited

OTHER PUBLICATIONS

M. Belkin and P. Niyogi, Laplacian eigenmaps and spectral techniques for embedding and clustering in NIPS, 2001.

J. Bellegarda, Latent Semantic Mapping: Principles and Applications, Morgan & Claypool, 2008 (Book).

F. Pereira, N. Tishby, and L. Lee, "Distributional clustering of English words," in ACL, 1993.

Y. Bengio, R. Ducharme, P. Vincent, and C. Jauvin, "A neural probabilistic language model," JMLR, vol. 3, pp. 1137-1155, 2003.

L. Buchanan, C. Burgess, and K. Lund, "Overcrowding in semantic neighborhoods: Modelling deep dyslexia," Brain and Cognition, 1996 (Book).

C. Burgess and K. Lund, "Parsing constraints and high dimensional semantic space," Language and Cognitive Processes, 1997. (Book).

S. Abney, R. E. Schapire, and Y. Singer, "Boosting applied to tagging and PP attachment," EMNLP, 1999.

A. Ratnaparkhi, "A Maximum Entropy Part-of-speech Tagger," in EMNLP, 1996.

T. Joachims, "Making large-scale SVM learning practical," in Advances in Kernel Methods—Support Vector Learning, 1998.

M. Collings and N. Duffy, "New ranking algorithms for parsing and tagging: Kernels over discrete structures and the voted perceptron." in ACL, 2002.

A. Mnih and G. Hinton, "Three new graphical nodels for statistical language modelling," in ICML, 2007.

R. Collobert and J. Weston, "A unified architecture for natural language processing: deep neural networks with nultitask learning," in ICML, 2008.

M.P. Marcus, B. Santorini, and M.A. Marcinkiewicz, "Building a large annotated corpus of English: The Penn Treebank," Computational Linguistics, vol. 19.2, pp. 313-330, 1993.

P. Haffner, "Scaling large margin classifiers for spoken language understanding," Speech Communication, vol. 48, No. IV, pp. 239-261, 2006.

N. Okazaki, "CRFsuite: a fast implementation of Conditional Random Fields (CRFs)," 2007.

T. Brants, "TnT—A Statistical Part-of-Speech Tagger," in ANLP, Seattle, WA, 2000.

K. Toutanova, D. Klein, C.D. Manning, and Y. Singer, "Feature-rich part-of-speech tagging with a cyclic dependency network," in HLT-NAACL, 2003.

XTAG, "A Lexicalized Tree-Adjoining Grammar for English," Tech. Rep., University of Pennsylvania, http://www.cis.upenn.edu/ xtag/gramrelease.html, 2001

S. Bangalore and A.K. Joshi, Eds., Supertagging, MIT Press, 2010.

\* cited by examiner

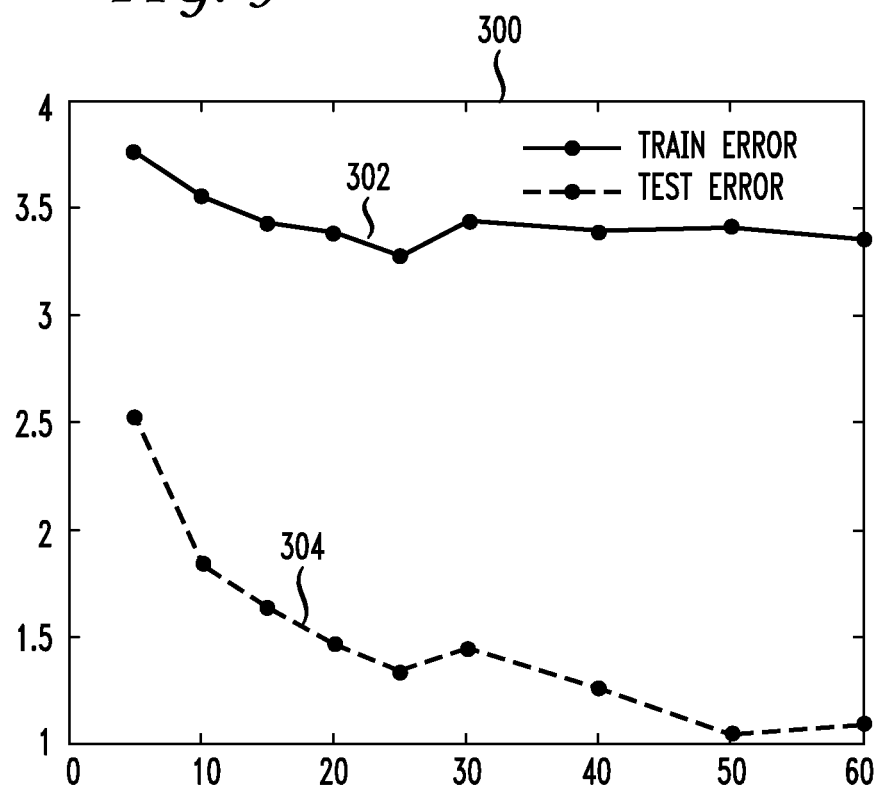

SYSTEM AND METHOD FOR LEARNING LATENT REPRESENTATIONS FOR NATURAL LANGUAGE TASKS

BACKGROUND

1. Technical Field

The present disclosure relates to classification tasks pertaining to natural language processing. More specifically it describes systems for generating labels for rarely encountered or previously unencountered words.

2. Introduction

Predicting task labels for words that have either not been observed at all or have not been observed sufficiently frequently is one of the key challenges for empirical approaches to Natural Language (NL) tasks. For frequently encountered words in a corpus, most modeling techniques estimate statistics reliably and predict labels for such words quite accurately. However, for infrequent words (including rare words and unseen words), the label prediction accuracy of most models is significantly lower compared to the label prediction accuracy for frequently encountered words in a corpus.

Several techniques attempt to address this issue, but each technique presents various drawbacks and additional problems. For tagging tasks such as part-of-speech (POS) tagging, orthographic features of a word, such as whether a word is upper case or not, whether it is a digit or not, the word's suffix and prefix characters, can be used during training Preferring sparse models using regularization terms is another way to generalize the models. Use of prior resources such as dictionaries in POS tagging and Gazetteers in named entity recognition tasks are other ways to address this issue.

The central problem is that in a localist representation, which includes words written as character sequences, establishing similarities between two words is non-trivial. Word similarity can be based on orthography as observed in morphologically related words such as hit and hitting, syntactically similar words such as transitive verbs hit and kick, and semantically similar words such as hit and beat.

Previous work typically decouples the construction of latent representations for words from the task the latent representations are used to solve. Latent representations are learned using task-agnostic criteria based on similarity metrics of discrete representations. While such representations might result in human-interpretable lexical neighborhoods, they may not be optimal for solving the task at hand.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure includes techniques that learn latent representations to optimally solve the tasks of POS tagging and supertagging, for example. In POS tagging, the system assigns part-of-speech labels to every word, for example. In supertagging, the system assigns syntactic fragment labels to words of a sentence, for example. This disclosure also discusses the trade-offs between task accuracy and complexity of representations, shows that latent representations improve task accuracy especially for rare words, and illustrates that the latent representation learned from POS tagging task, for example, results in faster learning for supertagging tasks. The disclosure discusses a learning architecture and a range of experiments analyzing the trade-offs between task accuracy and representational issues for POS tagging and supertagging tasks.

Where previous approaches lie on a spectrum ranging from localist representations at one end to distributed representations on the other end, this approach includes a discriminatively trained tagging architecture based on a distributed latent representation for words. This disclosure also includes a discriminative training algorithm which uses an alternate gradient descent type training.

The approach uses continuous valued latent representations in a connectionist model setting. Further, a learned latent representation can predict labels for rare words. At a high level, the disclosure provides a way to transfer the semantic space from one task to another task, such as from a part-of-speech tagging task to a supertagging task. For example, the system can track a sentence context for frequently encountered words. Thus, if the system tracks a particular sentence context for the word "dog" and encounters a word "cat" with a similar or matching sentence context, the system can deduce that the words "dog" and "cat" are similar.

The approaches set forth herein embed words in a lower dimension lexical space that can be used for computational linguistics as well as for psycholinguistics. By embedding words in a lexical space, words are represented using continuous valued representations and similar words have similar representations based on distributions of morphological and lexical contextual features encoded in their representations. By identifying similarities between representations, the approaches disclosed herein can better predict labels for rare or unencountered words.

Disclosed are systems, methods, and non-transitory computer-readable storage media for learning latent representations for natural language tasks. A system configured to practice the method analyzes, for a first natural language processing task such as part-of-speech tagging, a first natural language corpus to generate a latent representation for words in the first natural language corpus. Then the system analyzes, for a second natural language processing task such as supertagging, a second natural language corpus having a target word. The target word can be more than one word. The target word can be, for example, a rare word or a word that has not been encountered in the first natural language corpus. Then the system can predict a label for the target word based on the latent representation. Further, the system can predict the label for the target word based on a connectionist model that includes a learnable linear mapping which maps each word in the first natural language corpus to a low dimensional latent space and/or a classifier that classifies low dimensional representations of words. The system can assign the label to one or more target word.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a plot of the errors on the train and test set;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for labeling latent representations of words, such as rare or unencountered words. A brief introductory description of a basic general purpose system or computing device in FIG. 1 which can be employed to practice the concepts is disclosed herein. A more detailed description of the steps, modules, processes, and embodiments for learning distributed latent representations will then follow. The model described herein can holistically learn a distributed latent representation of words and a non-linear classifier for natural language processing tasks such as part-of-speech tagging and supertagging. The learned latent representation can interact with the task specific classifiers and affect their accuracies in a variety of ways. Further disclosed herein is a high-performance architecture which can perform the above two tasks. Finally, the disclosure turns to the problem of classifying unseen words, namely associating a label with the unseen word, and estimating its latent representation. These variations shall be discussed herein as the various embodiments are set forth. The disclosure now turns to FIG. 1.

Figure 1:
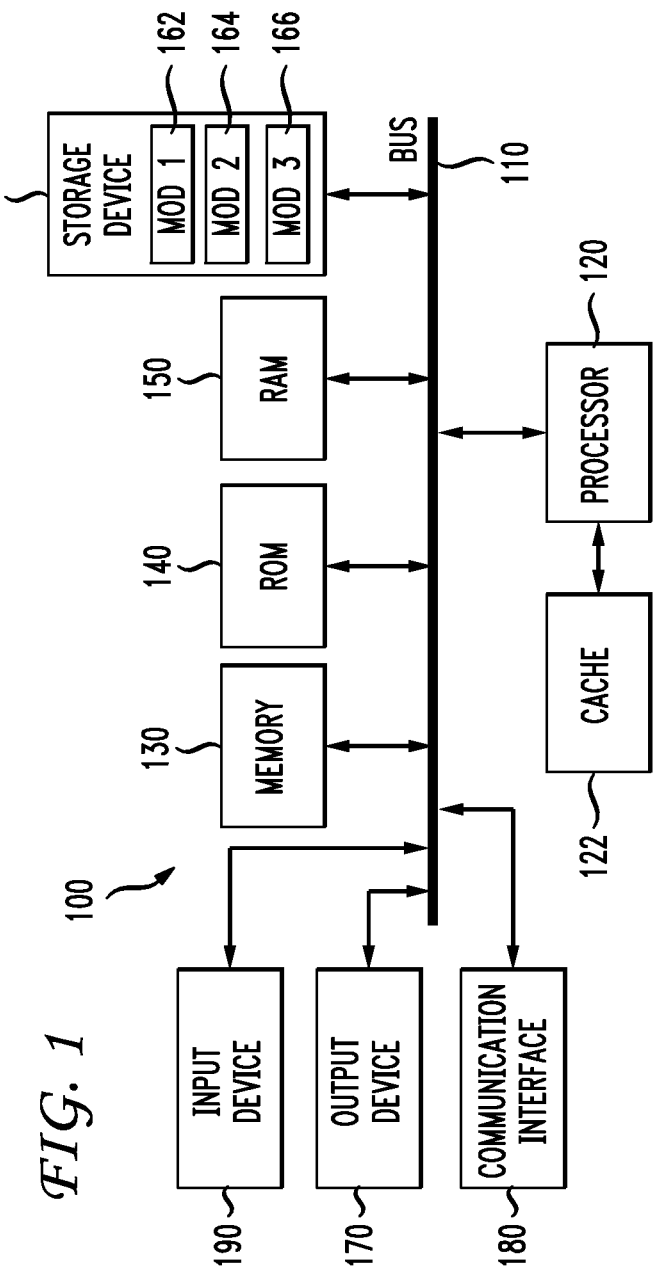
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2A:
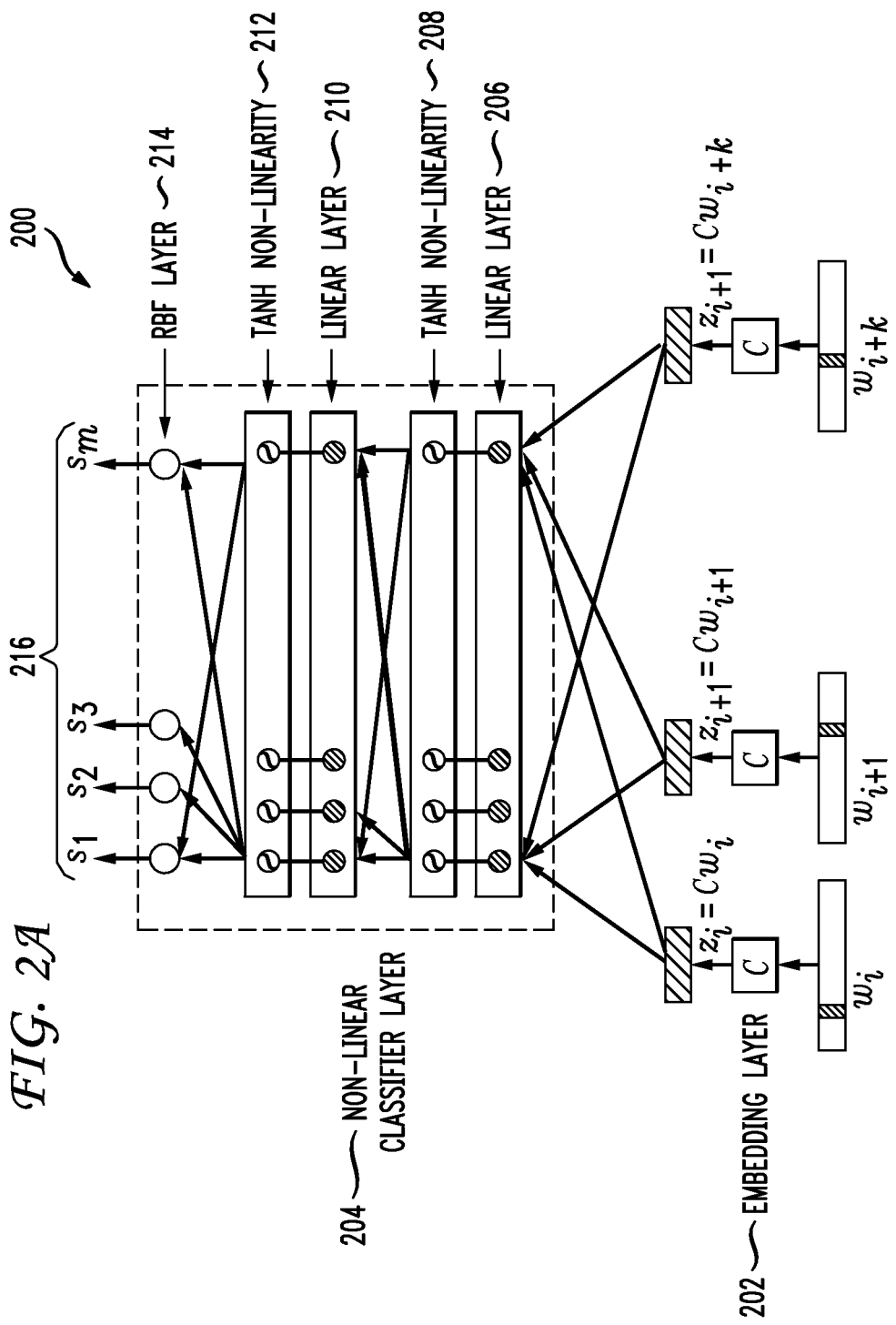
FIG. 2A illustrates a first example architecture for simultaneous learning of the latent distributed representation of the words and for solving natural language processing tasks such as part-of-speech tagging and supertagging.
Figure 2B:
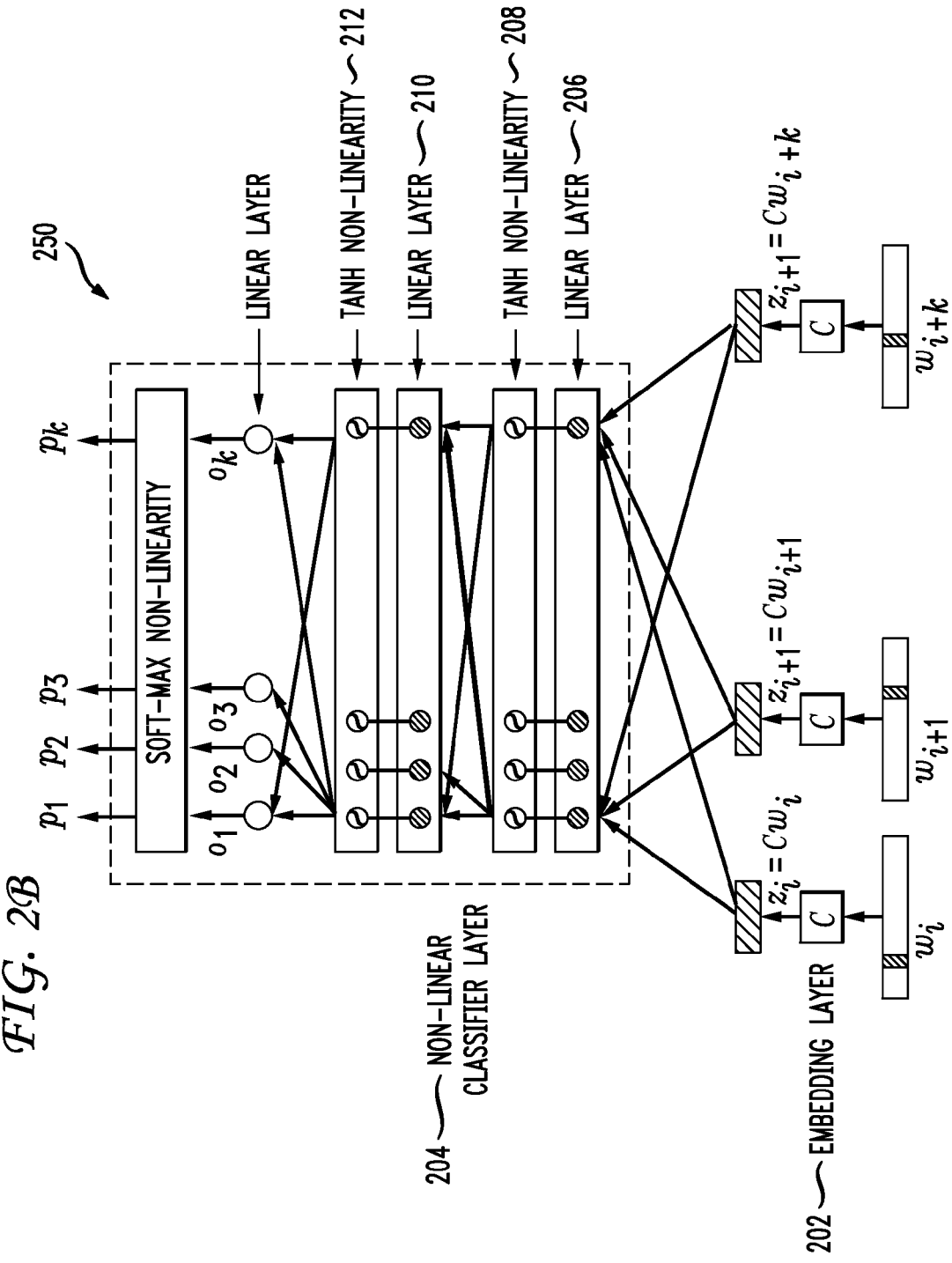
FIG. 2B illustrates a second exemplary architecture.

Having disclosed some components of a computing system, the disclosure now turns to FIGS. 2A and 2B, which illustrate architectures used for simultaneous learning of the latent distributed representation of the words and for solving natural language processing tasks such as part-of-speech tagging and supertagging. Part-of-speech tagging can include marking words in a corpus as corresponding to a particular part of speech, based on its definition and context. Supertagging can include a tagging process for assigning lexical entries to words in a corpus. FIG. 2A illustrates some of the details of the connectionist model used for simultaneously learning the distributed representation of words and solving a given natural language processing task. Broadly, one can view the model as being composed of two components. The first component is an embedding layer 202, or learnable linear mapping, which maps each word onto a low dimensional latent space. For example, the system can map a 100,000 dimensional space into a lower dimensional space such as a 40 dimensional space. The low dimensional representation of a sequence of words is obtained simply by concatenating the representations of individual word. The second component is the non-linear classifier layer 204 that takes as input the low dimensional representation of words and produces a vector of class conditional probabilities. FIG. 2A illustrates an exemplary layout of the architecture 200. FIG. 2B illustrates an alternative exemplary architecture 250.

The set of N unique words in the vocabulary of the corpus is denoted by $W=\{w_1, w_2 \ldots w_N\}$. The first layer 202 maps each word $w_i$ to a continuous vector $z_i$ which lies in a D dimensional latent space as shown by the following equation:

$$z_i = C_{wi}, i \in \{1, \ldots, N\} \qquad \text{Equation 1}$$

When each word $w_i$ is coded using a 1-of-n coding (i.e., the i-th word of the vocabulary is coded by setting the i-th element of the N dimensional vector to 1 and all the other elements to 0), then the above mapping can be represented by the linear function:

$$z_i = C \cdot w_i \qquad \text{Equation 2}$$

where $C \in \mathfrak{R}^{D \times N}$ C is a projection matrix. Then the i-th column $C_{wi}$ of this projection matrix corresponds to the continuous representation of the word $w_1$. The elements of this projection matrix can be viewed as free parameters or latent variables that are to be learned. Continuous representation of any k-gram $(w_i w_{i+1} \ldots w_{i+k})$ extracted from the corpus can now be obtained by simply concatenating the low dimensional projection of each of its words as shown below:

$$z = (z_i z_{i+1} \ldots z_{i+k}) \qquad \text{Equation 3}$$

The classification layer 204 takes as input the encoding vector z of the k-gram, obtained from the features layer 202. This layer 202 can include of multiple perceptron layers 206, 208, 210, 212, 214, one stacked on top of the other in any desired combination, permutation, or order. Each perceptron layer is a type of single layer artificial neural network that can be a very simple kind of linear classifier. A perceptron layer can be trained to produce a correct target vector given a corresponding input vector. In this case, the input and target vectors describe different aspects of latent representations of parts of speech. Some embodiments use a three sub-layer architecture, but other numbers and types of layers can also be used. The first two sub-layers can be standard fully connected perceptron layers, one stacked on top of the other. The final layer (output) can either be a standard Radial Basis Function (RBF) layer 214 in some embodiments, or can be a linear layer followed by a Softmax function.

Each perceptron layer can include a linear module 206 followed by a tan h non-linearity 208 applied component wise to the output of the linear module, as shown in FIG. 2. More generally, the input to the k-th such layer can be denoted by $x^k$, a vector of size $n_k$. Then the operation performed by the perceptron layer is given by the following equation:

$$h_j^{k+1} = \tanh\left(\sum_l m_{jl}^k x_l^k + b_j^k\right) \qquad \text{Equation 4}$$

where $m_{jl}^k$, are the free parameters of the linear module, $b_j^k$ is the bias associated with the j-th output unit, and $h_j^{k+1}$ is the hidden layer activities associated with the j-th output unit. In matrix notation, the operation shown in Equation 4 can be written as shown below:

$$h^{k+1} = \tan h(M^k x^k + b^k) \qquad \text{Equation 5}$$

where $h^{k+1}$ is a vector of hidden layer activation of size $n_{k+1}$, $b^k$ is a vector of biases of size $n_{k+1}$, and $M^k$ is a matrix of free parameters of dimension $n_{k+1} \times n_k$. The vector $h^{k+1}$ is supplied as input to the (k+1)-th layer.

The input to the first perceptron layer 206 can be the vector z, of latent representation of a k-gram, illustrated by the following equation:

$$h^2 = \tan h(M^1 z + b^1) \qquad \text{Equation 6}$$

and the input to the second perceptron layer 208 (stacked on top of the first one) can be the vector $h^2$:

$$h^3 = \tan h(M^2 h^2 + b^2) \qquad \text{Equation 7}$$

Finally, the last layer (the output layer) 214 is could either be made up of standard Radial Basis Functions (RBFs) units or a linear layer followed by a Softmax layer. In the case of RBF units the number of RBF units can be equal to the number of classes: one for each class. The output of the i-th RBF unit computes the Euclidean distance between the input vector and a fixed parameter vector p, associated with the unit, also called RBF center, given by the equation:

$$s_i = \sum_j (p_{ij} - x_j)^2 \qquad \text{Equation 8}$$

The further away the input from the RBF center, the larger is the RBF output 216. This output 216 can be interpreted as a penalty term measuring the fit between the input and the model of the class associated with the RBF unit. In probabilistic terms, the output 216 can be interpreted as an un-normalized negative log-likelihood of a Gaussian distribution in the space of configurations of the input layer to the RBF. Given an input, the loss function of the model should be designed in such a way so as to get the configuration of the input to RBF units as close as possible to the RBF center corresponding to the desired class. Experimental data show that the RBF centers were vectors of size equal to the number of classes, with all the elements set to −1, except for the i-th element which was set to 1, corresponding to the i-th class.

In the output layer, instead of RBF units one could also have a fully connected linear layer with size equal to the number of classes. Finally the output of this linear layer is passed through a soft-max function to generate the conditional probabilities of classes. Let $o_j$ denote the output of the j-th unit of the linear layer. Then the output of the i-th unit of the soft-max non-linearity is given by $$p_i = \frac{e^{o_i}}{\sum_j e^{o_j}}.$$

In summary, each word in a given sequence of k words is first mapped onto a D dimensional continuous space to create a vector of size kD. This vector is then fed as input to the classifier which generates a vector of class probabilities conditioned on the input. Next the output of the second perceptron layer is fed as input to the output layer (either an RBF layer or the linear layer followed by softmax) to generate a vector of size equal to the number of classes, containing the penalties (or probabilities) associated with each class. The model consists of two sets of trainable parameters. The first set consists of the parameters of the mapping matrix C, and the second set consists of the parameters associated with the multi-layer classifier, namely the matrices of the two linear modules $M^1$, $M^2$, and the biases $b^1$ and $b^2$, collectively denoted by M.

The disclosure now turns to a discussion of training the model. The training set consisting of the input-output pairs is denoted by $S=\{(x^i, y^i): i=1, \ldots, N\}$. Each input $x^i$ is a sequence of k words (a k-gram) obtained by sliding a window of size k over the entire corpus. In particular, for a sentence $(W=w_1 \ldots w_r)$ with tag sequence $(T=t_1 \ldots t_r)$, each training example $x^i$ includes a target word $w_j$, with, for example, six words from its left $(c_l = w_{j-6} \ldots w_{j-1})$ and right context $(c_r = w_{j+1} \ldots w_{j+6})$, in addition to orthographic features such as three character suffix and prefix, digit and upper case features $o_{w_j}$. Thus a training example $(x^i, y^i)$ is constructed as $x^i=(c_l, w_j, c_r, o_{w_j})$ and $y^i=t_j$. The nature of the tag $t_j$ depends on the task at hand. For example the tag $t_j$ can be a part-of-speech tag or the supertag of the middle word. Also the collection of parameters associated with the multi-layer classifier is denoted by $M=\{M^1, M^2, b^1, b^2\}$. Then the classifier can be represented as a non-linear parametric function $G_M$, with parameters M, that takes as input the distributed representation $z^i$ of $x^i$ and produces a vector of penalties (or probabilities), one per class. If $q^i$ denotes the index of the class to which sample i belongs, then the likelihood associated with the i-th training sample under the model is given by:

$$p^i = [G_M(z^i)]_{q^i} = \frac{e^{o_{q^i}}}{\sum_j e^{o_j}} \qquad \text{Equation 9}$$

Thus, the likelihood of the entire training set is as follows:

$$L = \prod_{i=1}^{N} p^i = \prod_{i=1}^{N} \frac{e^{o_{q^i}}}{\sum_j e^{o_j}} \qquad \text{Equation 10}$$

Training the system can involve adjusting the parameters M and C to maximize the likelihood of the data. In some implementations, adjusting the parameters M and C can reduce to simultaneously minimizing the negative log likelihood loss as shown below:

$$\mathcal{L} = -\log L = \frac{1}{N} \sum_i \left( -o_{q^i} + \log \sum_j e^{o_j} \right) \qquad \text{Equation 12}$$

with respect to the parameters M and C. This can be achieved through an alternating gradient descent type algorithm. The alternating gradient descent algorithm, for example, iterates through two phases until convergence. In phase 1, the latent variables C are kept fixed and the loss is minimized with respect to the parameters M of the classifier. The system runs a standard stochastic gradient descent algorithm for all the samples in the training set. For a training sample $x^i$ the forward propagation step involves computing the low dimensional continuous embedding $z^i$, and passing it through the multi-layer perceptron followed by an RBF layer to get the energy. Finally, the system computes the gradient of the energy with respect to the parameters M using the back propagation step and updates the parameters.

In Phase 2, the parameters M are fixed and the loss is minimized with respect to the latent variables C using stochastic gradient descent or other suitable approach. The forward propagation step is exactly the same as in Phase 1. In the back propagation step however, the system computes the gradient of the energy with respect to the parameters C and the parameters updated.

Once the system is trained, the process of inference on a new sample $x^o$ is trivial. It involves computing the (learned) low dimensional distributed representation $z^o$ and passing it through the multi-layer network to obtain a vector of penalties corresponding to each class. The class label which corresponds to the lowest penalty is returned as the predicted label.

Besides the learnable parameters M and C, the model also requires choosing a number of hyper-parameters. In particular the system makes a choice on the number of perceptron layers which are to be stacked, the number of hidden units in each layer, the dimension of the latent space, the learning rate for the parameters in the perceptron layers, the learning rate for the latent representation, and how to initialize the parameters of the perceptron layer and the latent representation. All the hyper-parameters can be tuned on a small subset of training set using the process of validation.

The disclosure turns now to experiments and results. The experimental data investigate the trade-offs in latent lexical representations and their affects on performance on part-of-speech and supertagging tasks. The experimental data are based on the Penn Treebank part-of-speech (POS) tagged corpus. The training corpus consists of 1.1 million words and the test corpus consists of 53,153 words. The tag set consists of 47 tags. A number of different architectures of varying sizes were used in the experiments. In some experiments we used an architecture which had no hidden perceptron layers. In other experiments the architecture has two hidden perceptron layers, with 150 units in the first hidden layer and 280 units in the second hidden layer. The output layer had 47 units corresponding to the 47 POS tags. The dimension of the latent space was set to 25. The learning rate in the stochastic gradient descent process for the classifier layer was set to $\eta 1=0.00001$ and for the embedding layer 202 was set to $\eta 2=0.001$. Both $\eta 1$, and $\eta 2$ were decreased by a factor of 0.8 after every 5 epochs. Lastly the parameters of the classifier layer were initialized to random values uniformly distributed between $-\beta$ and $\beta$, where $$\beta = \frac{1}{(fanin)^{1/2}}.$$

The parameters of the embedding layers 202 were initialized to random values uniformly distributed between −0.01 and 0.01.

Due to the highly non-linear nature of the architecture, the loss function has multiple local minima. Consequently, during training of the model the parameters might converge to one of the local minima. The initialization of the parameters determines the local minima to which the model converges. The validation set was used to select the best performing connectionist architecture—variations in the number of hidden layers (non-linearity) and the number of hidden units (capacity).

Values of other hyper-parameters associated with the model, such as, learning rate of embedding and classifier layer, the initialization routine of their parameters, were also chosen using the process of validation. Even though one of the classifier is log-linear (with no hidden perceptron layer), the learnability of the embedding layer makes the architecture highly non-linear, making it prone to converging onto a bad local minima. To circumvent this problem, several models were trained independently, each initialized with a different set of random embedding and classifier parameters. The system selected the one that performed the best on the validation set. The error on the test set obtained by the model which performed best on the validation set was 3.02%.

As mentioned earlier, due to the nonlinear nature of the architecture the parameters are prone to converging onto a local minima. Consequently, the experimental data included multiple models trained from different initializations of the parameters. The POS tag predictions from each of these models are combined by a simple majority vote. The ensemble of theses different individual models shows improvement over each of the individual models.

An ensemble error rate which is lower than the error of any of the individual models, implies that the individual models are making different mistakes. Thus different representations results in different mistakes. However, building a single representation which combines all the individual representation is not trivial and is an open question. Given that the dimensions of each of the representations do not have any consistent interpretation, a simple average does not work.

Once the representations of the words and the parameters of the classifier layer are learned, the process of decoding a new sample simply involves a single forward propagation step, which is composed of a few matrix vector multiplications and addition operations. This makes the architecture very efficient during decoding. The approaches set forth herein can decode much faster than other baseline models in experimental results. For example, one experimental model displayed a decoding speed 256 times faster than a second order polynomial support vector machine (SVM), even if the experimental model was slightly less accurate.

Next, the experimental data explores random versus learned representation in an attempt to quantify the benefit of learning a representation over using a random representation. The experimental data included two sets of trained POS tagging models. The first set includes 4 trained classifiers of increasing capacity. The latent representation in this set was randomly initialized and kept fixed during training. In the second set, the latent representation was also allowed to train. The reason behind training multiple classifiers of increasing capacity was to determine whether a classifier of sufficiently large capacity can subsume the benefits of a learned representation. Learning the representation significantly improves the performance of the system. Furthermore, even though increasing the capacity of the architecture does indeed improve the performance even when the representation is learned, the entire benefit of a learned representation cannot be subsumed into the classifier.

The experimental data explores the dimensionality of representations and the effects of the dimensionality of the latent space to ascertain whether increasing the dimensionality of the latent space reduces the error, and whether this reduction of error is monotonic or not. The classifier used for the POS tagging experiment had 150 units in the first hidden layer and 280 units in the second hidden layer. The initialization of the parameters and the learning rates were set in the same way as discussed before. Keeping the capacity of the classifier fixed, a number of models were trained with increasing dimensionality of the latent representation, namely 10, 15, 20, 25, 30, 40, 50, and 60. FIG. 3 illustrates the plot 300 of the errors on the train set 302 and test set 304. Increasing the dimensionality results in improved performance because an increase in dimensionality results in the increase in capacity of the model and hence a better representational power. However, this effect is not monotonic and ceases to exist beyond 30 dimensions. This may be attributed to over fitting. Furthermore, close to the state-of-the-art performance of the distributed latent representation of dimension 25, clearly points towards its representational power and its benefits. This is further evident from the close to state-of-the-art performance results obtained in experiments exploring quality of representation where the representation learned from the neural network classifier is used as an input to a Maxent classifier.

The disclosure turns to a discussion of experimental results on rare words. As mentioned above, one problem for empirical methods based on localist representations is the issue of sparsity. It is hard to predict the labels for rare words accurately since the system has insufficient evidence to train the parameters of predictive models. Using latent representation of words, the system can leverage the similarity between a rare word and a frequent word, and thereby improve the prediction on such rare words.

Figure 7:
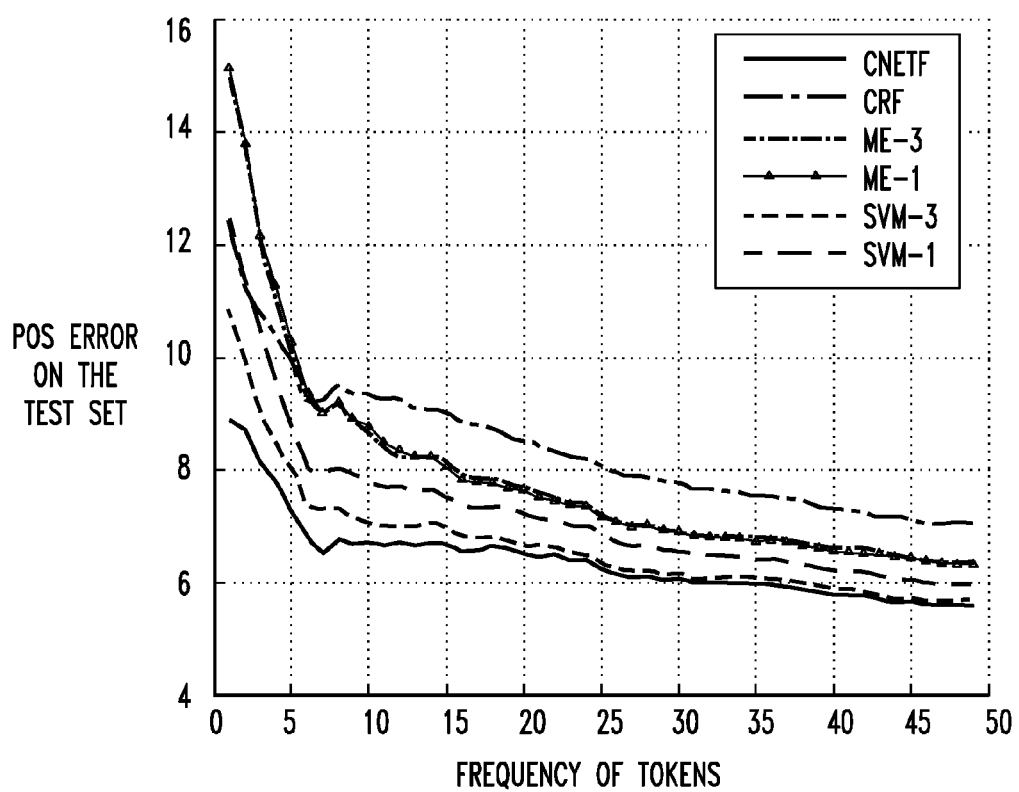
FIG. 7 illustrates exemplary parts-of-speech errors on the test set plotted against the frequency of tokens.

FIG. 7 illustrates a plot 700 of the error rates for words below a certain frequency for the six different approaches: the proposed DeepNet architecture, a unigram Maximum-Entropy model (ME-1), a trigram Maximum-Entropy model (ME-3), a unigram second order polynomial Support Vector Machine (SVM-1), a trigram second order polynomial Support Vector Machine (SVM-3), and a Conditional Random Fields Model (CRF). As can be seen, the error rate for low frequency words (<20 count) is significantly high in other models using the localist representation and as much as 5% better for DeepNet architecture. This difference narrows for words with higher frequencies. Furthermore, Table 1 gives the overall exemplary error rates of all the six different approaches.

TABLE 1

| | ME-1 | ME-3 | SVM-1 | SVM-3 | CRF | CNETF |
|---|---|---|---|---|---|---|
| Err | 3.31% | 3.14% | 3.10% | 2.77% | 3.14% | 3.02% |

Predicting labels for words that have not been seen in training even once (termed as unseen words) is not trivial and is handled differently than rare words. Most models use some heuristic to approximate the representation of unseen words based on orthographic features and use it for prediction. In experimental data based on the approaches set forth herein, when the representation of the unseen word is randomly initialized, the error rate is 15:60% as in contrast to about 13% for the second order SVM. One possible explanation for it is that in connectionist models the effect of a small number of orthographic features (a total of 6 bits) is overwhelmed with the presence of a large number of other coefficients. Note that for an unseen word, these orthographic features are the only source of information. SVMs seem to capture this information more effectively. In order to reduce the influence of the coupling of the classifier weights with the randomly initialized feature vector of the unseen word, the system set all the elements of the word representation to zero. This provides a model that predicts the tag of an unseen word using only the contextual information, with error reducing to 15:51%. These experimental results are compared to state-of-the-art POS taggers trained on the Penn Treebank tagset. The TnT tagger, a second order Markov model tagger based on generative model performs at about 3.3% error rate on the same data set with 15.8% error rate for unseen words. The Stanford tagger uses a cyclic dependency network trained by a discriminative training technique and achieves an error rate of 2.76% with an error rate of 10.96% for unseen words. In contrast to these approaches, the experimental models based on the approaches set forth herein do not use the POS tags of the context words, consequently, obviating the need for a slow dynamic programming style decoding. In fact, using our models, each word of the input sentence can be assigned a tag in parallel, potentially resulting in dramatic decoding speeds. Despite the simpler features, the experimental models perform at state-of-the-art error rates.

Furthermore the flexibility of this approach leads to a principled algorithm for computing the representation of unseen words simultaneously with their label. The system first maps an unseen word $w^o$ to a random point in the latent space ($z_{unseen}^o$). Then given $z_{unseen}^o$ and its left and right contexts $c_l^0$, $c_r^0$, the system can compute the latent vector $z^o$ as described before. The representation $z^{o*}$ is learned by jointly minimizing the loss function with respect to $z_{unseen}^o$ and the labels y as shown below:

$$[z^{o*}, y^*] = \arg\min_{z_{unseen}^o, y} G_M(Cz^o) \cdot f_y \qquad \text{Equation 13}$$

Finally, the single representation of all the unseen words is obtained by taking the average of all the representations obtained by the above process. Using this approach the system can compute the prediction accuracy of the unseen words and compare it to the one obtained using random representations. This approach has some similarities to weakly supervised approaches to POS tagging and can be enhanced by the use of a dictionary that maps words to possible POS tags.

Turning to a profile of the neighborhoods in the latent space, in order to inspect the distance between words in the embedded space, the system can perform the following experiment. For each word in the vocabulary and for each of its left and right contexts, the system extracts the corresponding latent vector z from the latent space. The centroid of these set of latent vectors can be used as the prototypical vector for that word. In order to compute the distance between two words, the system uses the Euclidian distance between their prototypical vectors.

Table 2, below, presents the words that are closest, ordered by increasing Euclidian distance, to the word in the left column.

TABLE 2

| Word | Nearest Words based on Euclidian Distance |
|---|---|
| of | For at by from with under into since against until over |
| for | At of by with from into under against until over before |
| this | Another some all those these every |
| when | Before because after where |
| hit | Produced reduced developed held left released provided carried |
| hitting | Reaching using called established watching carried fighting produced addressing handled removing |
| sold | Established paid produced held made released reduced built completed extended worked |
| sell | Raise buy replace reduce pay defend develop extend recover provide write |
| selling | Building credit buying improved relief testing fire growth operating negotiations nearly |
| bank | Investor union thrift airline man board patent department state oil brokerage |
| banks | Studies needs directors oil merchandise candidates rivals companies consumers brokerage readers |
| stocks | Claims campaign moves firms reports trial employment exports funds fund sales |
| mostly | Partly largely apparently particularly especially |
| large | Strong private huge potential unusual steady major full tough public basic |

For example, prepositions such as "of" and "for" are nearest to other prepositions. Similar kind part-of-speech preservation can be observed for other words as well—determiner "this" has other determiners as its neighbors, the past tense verb "hit" and "sold" have other past tense verbs, infinitival verb "sell" has other infinitival verbs in its neighborhood. For nouns, the neighborhood is based on singular/plural distinction and finally the adverb "mostly" and adjective "large" have other adverbs and adjectives in their neighborhoods.

Figure 4:
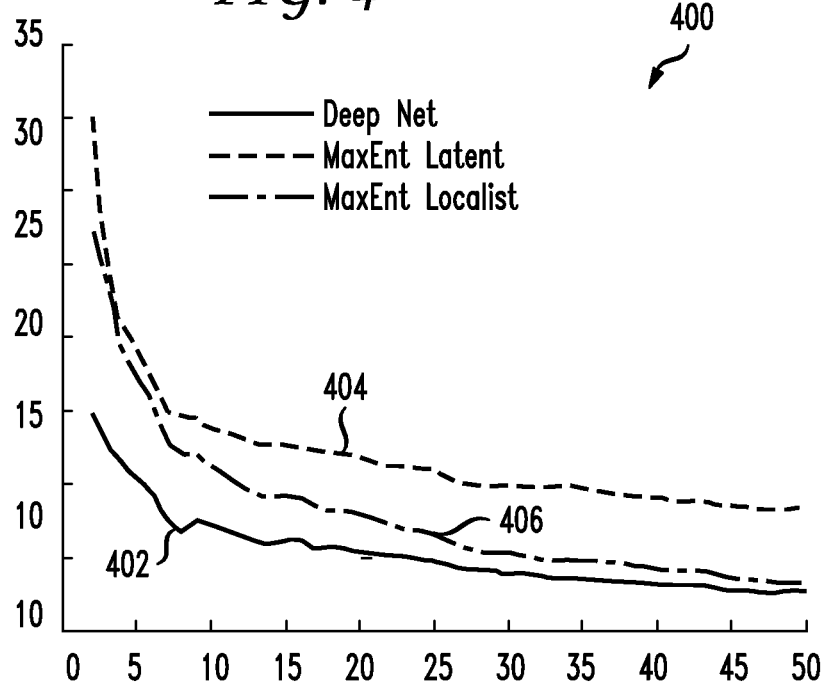
FIG. 4 illustrates a plot of error rates for words below a certain frequency for Maxent localist, Maxent latent, and Deep Net architectures.

The learned latent representation of the words can be used beyond its use in the connectionist model, such as using the representations in conjunction with other classifiers. For example, the system can train a Boostexter and a Maximum entropy-based (Maxent) classifier. For Boostexter, the system can use each dimension of the latent representation as a continuous valued weak learner. For the Maxent classifier, the system can treat each dimension of the latent representation as a discrete valued feature. The latent representation in conjunction with the classifier can provide optimal accuracy. However, the representation is still usable in the context of other classifier, albeit with lower accuracy. FIG. 4 illustrates a plot 400 of the performance of these three models 402, 404, 406 on low frequency words.

Experiments directed to latent representations for supertagging used the same training and test sets for supertagging as for POS tagging. The supertag set has been derived from the XTAG grammar and contains 512 supertags. Supertag labels represent syntactic information, that are richer than parts-of-speech, such as the verb-argument valency (intransitive, transitive, ditransitive), voice (active, passive), transformation (relative clause, wh-questions). The supertagging models were trained and tested on two variations of the data set. The first variant used the POS tags for the words as part of the input in addition to the features used for POS tagging. The second variant omitted the POS tags for the words from the input.

While for POS tagging, adding deep non-linear layers to the classifiers did not improve accuracy due to the simplicity of the task, non-linear layers are vital for the supertagging task, due to the complexity of the task. To this end, the experiment also included another trained connectionist architecture with one hidden perceptron layer followed by a linear layer and a soft-max non-linearity. One experimental configuration included 600 hidden units in the perceptron layer. Table 3 illustrates experimental results of all these models on two variants of the data set and error rates on a test set for the supertagging task using different models. The column labeled Words+POS gives the result on the data set which uses the words and their parts-of-speech tags as input. The column labeled Words corresponds to the data set where the input does not contain part-of-speech tags.

TABLE 3

|        | Words + POS | Words  |
|--------|-------------|--------|
| ME-1   | 9.68%       | 12.84% |
| ME-3   | 8.33%       | 12.24% |
| SVM-1  | 8.99%       | 12.16% |
| SVM-3  | 8.82%       | 12.13% |
| CNETF  | 8.90%       | 11.85% |
| CNETFF | 8.73%       | 11.45% |

In order to further test the usefulness and/or quality of the learned representation, the system can conduct a number of tests across multiple natural language processing tasks. This type of test can answer questions such as can the latent representation learned for one particular task be of any use to some other task? Because in such highly non-linear models the way parameters are initialized matters a lot, can the representation be initialized for some task using the learned representation from some other task? Does this provide better prediction? Does it help in faster convergence? To answer these questions the system can first train a randomly initialized part-of-speech tagging model and use the representation learned from this model to initialize the latent representation of two supertagging models. In the first model, this latent representation was kept fixed and only the classifier was trained to predict the supertags. The motivation behind this experiment was to check the usefulness of the learned latent representation across tasks. In the second model, both the latent representation and the classifier were allowed to train for the supertagging task to see whether an "intelligent" initialization using the learned representation from some other task help in any way. Finally, these two models where compared with a third supertagging model which was trained starting with random initialization of all the parameters. In each of these models the number of hidden units in the first and the second layer were $nhid_1=250$, and $nhid_2=680$ respectively. The number of RBF centers were nout=498. The dimension of the latent space was set to 30. The learning rates, their annealing schedule and the initialization of the classifier layer and the embedding layer 202 was the same as that of part-of-speech experiments. Sample experimental results are presented in FIG. 5, which illustrates supertagging errors on the test set 500 as a function of the number of training epochs for the three models. The first line is the randomly initialized model 502. The second line is the model where initial latent representation is borrowed from part-of-speech tagging task and is held fixed 504. In the third line, the representation is allowed to train 506.

Figure 5:
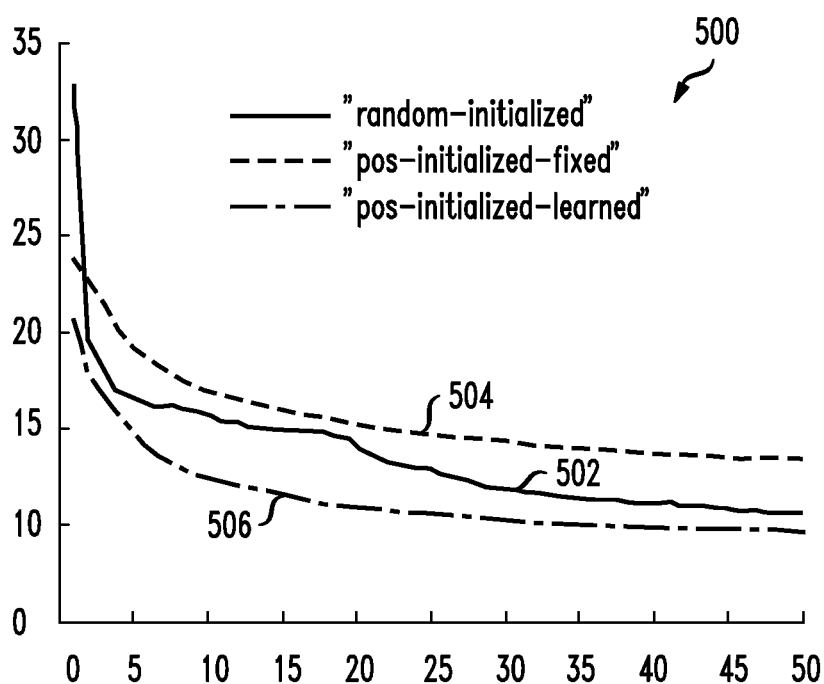
FIG. 5 illustrates supertagging errors on a test set as a function of the number of training epochs for three models.

The results shown in FIG. 5 lead to a number of observations. First, the representation learned for one task (part-of-speech tagging) can indeed be useful for other tasks such as supertagging. This is evident from the first model, where even though the latent representation is initialized using part-of-speech tagging task and kept fixed, it still results in system performance that is not very far from the state-of-the-art: around 12.89% error. Second, allowing this derived latent representation to learn leads to both faster convergence and better accuracy as compared to the model that is trained from scratch: around 9.59%.

Figure 6:
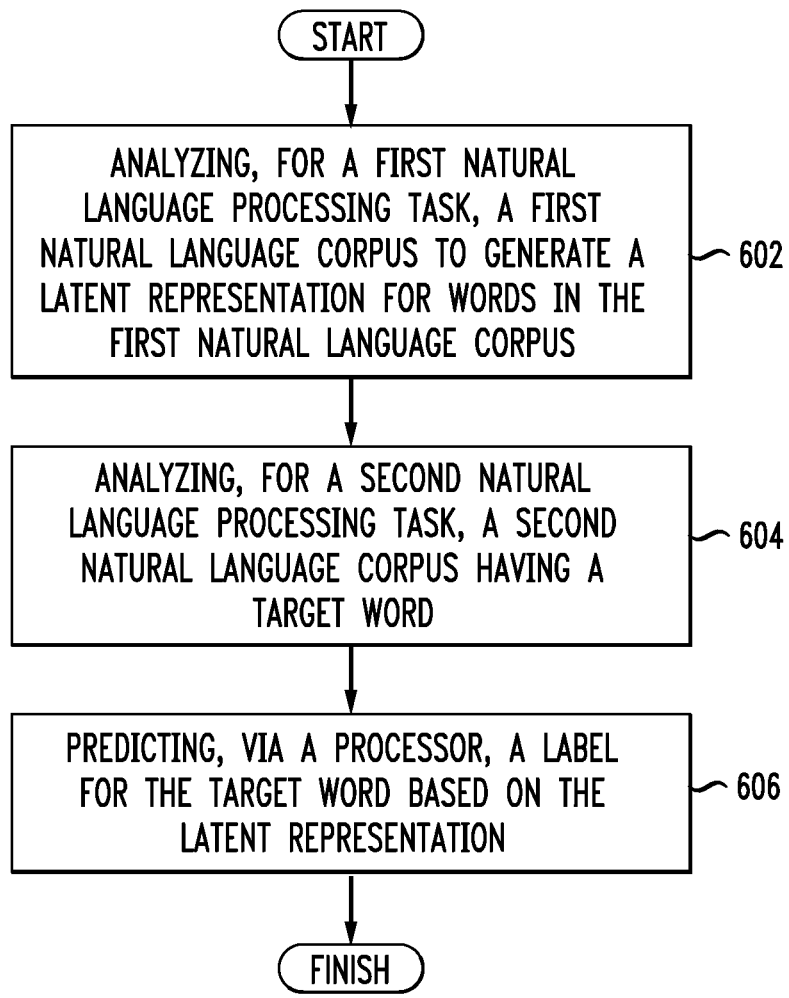
FIG. 6 illustrates an example method embodiment.

Having disclosed some basic system components and concepts, the disclosure now turns to the exemplary method embodiment for learning latent representations for natural language tasks as shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 analyzes, for a first natural language processing task, a first natural language corpus to generate a latent representation for words in the first natural language corpus (602). One exemplary first natural language processing task is a part-of-speech tagging task. The system 100 analyzes, for a second natural language processing task, a second natural language corpus having a target word (604). An exemplary second natural language processing task is a supertagging task. The target word can be, for example, a rare word and/or a word not encountered in the first natural language corpus. Further, the target word can be a collection of words, such as a set of words commonly uttered together as a phrase or a particular string of words.

The system 100 predicts, via a processor, a label for the target word based on the latent representation (606). The system 100 can predict the label based on a connectionist model, as described above. The connectionist model can include a learnable linear mapping which maps each word in the first natural language corpus to a low dimensional latent space, and/or a classifier that classifies low dimensional representations of words. The system 100 can optionally assign the label to the target word.

The approaches disclosed herein can be implemented using a connectionist architecture with a joint training of the representation and the classifier layers. This approach can provide two benefits. First, the use of latent representation improves performance of POS prediction on rare words and, second, using a trained latent representation from one task (POS tagging) results in faster convergence on another task (supertagging). This solution allows one to learn the latent representation in the context of a task with a diverse set of discriminatively trainable features that are tuned for the optimal performance of the task and can be applied to detect similarity between words given the context of the task and furthermore can be exploited to improve task performance. This approach can bring in attributes and meta features that are difficult to integrate using a more traditional localist approach. The system can fold in information that has all sorts of meta-information about a customer or task. Further, the system can integrate key knowledge space features imposed by an expert in that task.

The connectionist architecture described herein is highly flexible and fast for part-of-speech tagging and supertagging. Experimental data show the benefits of jointly learning a latent representation of words in such a framework for these tasks. Using a latent representation, the system can predict POS with improved accuracy for rare words. As the complexity of the task increases, as in supertagging, the non-linearity in the connectionist architecture can aid in improved accuracy. The architecture can be generalized for semi-supervised learning setting, where instead of a complete annotation of the data, only a dictionary of potential tags for each word is available.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
analyzing, for a first natural language processing task, a first natural language corpus to generate a latent representation for words in the first natural language corpus;
calculating, for each word in the latent representation, a Euclidian distance between a left context of the each word and a right context of the each word, to yield a centroid of latent vectors for each word in the latent representation;
analyzing, for a second natural language processing task, a second natural language corpus having a target word, the target word being a word that is not in the first natural language corpus; and
predicting, via a processor, a label for the target word based on the latent representation and the centroid of latent vectors for each word in the latent representation, wherein the predicting comprises iteratively executing an alternating gradient descent algorithm until convergence, the alternating gradient descent algorithm comprising, for each iteration, computing a low dimensional continuous embedding and passing the low dimensional continuous embedding through a multi-layer perceptron.

2. The method of claim 1, wherein the target word is one of a rare word and a word not encountered in the first natural language corpus.

3. The method of claim 1, wherein predicting the label for the target word is further based on a connectionist model.

4. The method of claim 3, wherein the connectionist model comprises a learnable linear mapping which maps each word in the first natural language corpus to a low dimensional latent space.

5. The method of claim 3, wherein the connectionist model comprises a classifier that classifies low dimensional representations of words.

6. The method of claim 1, further comprising assigning the label to the target word.

7. The method of claim 1, wherein the second natural language corpus comprises an input sentence, and wherein the method further comprises performing the predicting of the label for each word in the input sentence in parallel.

8. The method of claim 1, wherein the second natural language processing task is a supertagging task, the supertagging task comprising assigning a lexical entry to the target word.

9. The method of claim 1, wherein the target word is a collection of target words.

10. A system comprising:
a processor; and a computer-readable storage medium having instructions stored which, when executed by the processor, cause the processor to perform operations comprising:
  analyzing, for a first natural language processing task, a first natural language corpus to generate a latent representation for words in the first natural language corpus;
  calculating, for each word in the latent representation, a Euclidian distance between a left context of the each word and a right context of the each word, to yield a centroid of latent vectors for each word in the latent representation;
  analyzing, for a second natural language processing task, a second natural language corpus having a target word, the target word being a word that is not in the first natural language corpus; and
  predicting, via a processor, a label for the target word based on the latent representation and the centroid of latent vectors for each word in the latent representation, wherein the predicting comprises iteratively executing an alternating gradient descent algorithm until convergence, the alternating gradient descent algorithm comprising, for each iteration, computing a low dimensional continuous embedding and passing the low dimensional continuous embedding through a multi-layer perceptron.

11. The system of claim 10, wherein the target word is one of a rare word and a word not encountered in the first natural language corpus.

12. The system of claim 10, the computer-readable storage medium having additional instructions stored which, when executed by the processor, result in operations comprising:
  predicting the label for the target word based on a connectionist model.

13. The system of claim 12, wherein the connectionist model comprises a learnable linear mapping which maps each word in the first natural language corpus to a low dimensional latent space.

14. The system of claim 12, wherein the connectionist model comprises a classifier that classifies low dimensional representations of words.

15. The system of claim 10, the computer-readable storage medium having additional instructions stored which, when executed by the processor, result in operations comprising:
  assigning the label to the target word.

16. A computer-readable storage device having instructions stored which, when executed by a computing device, cause the computing device to perform operations comprising:
  analyzing, for a first natural language processing task, a first natural language corpus to generate a latent representation for words in the first natural language corpus;
  calculating, for each word in the latent representation, a Euclidian distance between a left context of the each word and a right context of the each word, to yield a centroid of latent vectors for each word in the latent representation;
  analyzing, for a second natural language processing task, a second natural language corpus having a target word, the target word being a word that is not in the first natural language corpus; and
  predicting, via a processor, a label for the target word based on the latent representation and the centroid of latent vectors for each word in the latent representation, wherein the predicting comprises iteratively executing an alternating gradient descent algorithm until convergence, the alternating gradient descent algorithm comprising, for each iteration, computing a low dimensional continuous embedding and passing the low dimensional continuous embedding through a multi-layer perceptron.

17. The computer-readable storage device of claim 16, wherein predicting the label for the target word is further based on a connectionist model, and wherein the connectionist model comprises a classifier that classifies low dimensional representations of words.

18. The computer-readable storage device of claim 16, having additional instructions stored which, when executed by the computing device, result in operations comprising assigning the label to the target word.

19. The computer-readable storage device of claim 16, wherein the second natural language corpus comprises an input sentence; and
  the computer-readable storage device has additional instructions stored which, when executed by the computing device, result in operations comprising performing the predicting of the label for each word in the input sentence in parallel.

20. The computer-readable storage device of claim 16, wherein the second natural language processing task is a supertagging task, the supertagging task comprising assigning a lexical entry to the target word.

* * * * *